(12) United States Patent
Storer et al.

(10) Patent No.: US 7,806,452 B2
(45) Date of Patent: Oct. 5, 2010

(54) ADJUSTABLE SECURITY PARTITION FOR A VEHICLE

(75) Inventors: Ron Storer, Villa Park, CA (US); Peter Kekich, Jr., Palm Desert, CA (US)

(73) Assignee: Xtreme Metal Fab, Inc., Breta, CA (US)

( * ) Notice: Subject to any disclaimer, the term of this patent is extended or adjusted under 35 U.S.C. 154(b) by 62 days.

(21) Appl. No.: 12/367,784

(22) Filed: Feb. 9, 2009

(65) Prior Publication Data
US 2010/0201148 A1 Aug. 12, 2010

(51) Int. Cl.
*B60N 3/00* (2006.01)
(52) U.S. Cl. .................. 296/24.43; 296/24.4; 280/749
(58) Field of Classification Search ............. 296/24.4, 296/24.42, 24.43, 24.46, 24.3; 280/749
See application file for complete search history.

(56) References Cited

U.S. PATENT DOCUMENTS

| | | | |
|---|---|---|---|
| 2,866,419 A | 12/1958 | Candlin, Jr. | |
| 3,214,211 A | 10/1965 | Setina | |
| 3,510,164 A | 5/1970 | Setina | |
| 3,667,801 A | 6/1972 | Setina | |
| RE27,948 E | 3/1974 | Setina | |
| 4,015,875 A | 4/1977 | Setina | |
| 4,173,369 A | 11/1979 | Roggin | |
| D253,765 S | 12/1979 | Roggin | |
| 4,595,227 A | 6/1986 | Setina | |
| 4,938,518 A | 7/1990 | Willemsen | |
| 5,536,057 A | 7/1996 | Stewart | |
| 6,250,700 B1 | 6/2001 | Traxler | |
| 6,669,259 B2 | 12/2003 | Murray et al. | |
| 6,827,382 B2 | 12/2004 | Murray et al. | |
| 6,983,969 B2 | 1/2006 | Murray et al. | |
| 7,195,297 B2 * | 3/2007 | Murray et al. | ............ 296/24.4 |
| 7,380,853 B2 | 6/2008 | Wells | |
| 2007/0176450 A1 | 8/2007 | Setina | |

OTHER PUBLICATIONS

Setina Manufacturing Company, Inc.; "Police Vehicle Equipment", 2007, pp. 1-11.

* cited by examiner

*Primary Examiner*—Lori L Lyjak
(74) *Attorney, Agent, or Firm*—Stetina Brunda Garred & Brucker

(57) ABSTRACT

A pivotably adjustable security partition installable in a vehicle for providing a barrier between a front occupant area and a rear occupant area is provided. The partition may be pivotably mounted to lower seatbelt mounts via an articulating joint. Additionally, the partition may be secured to upper seatbelt mounts.

15 Claims, 5 Drawing Sheets

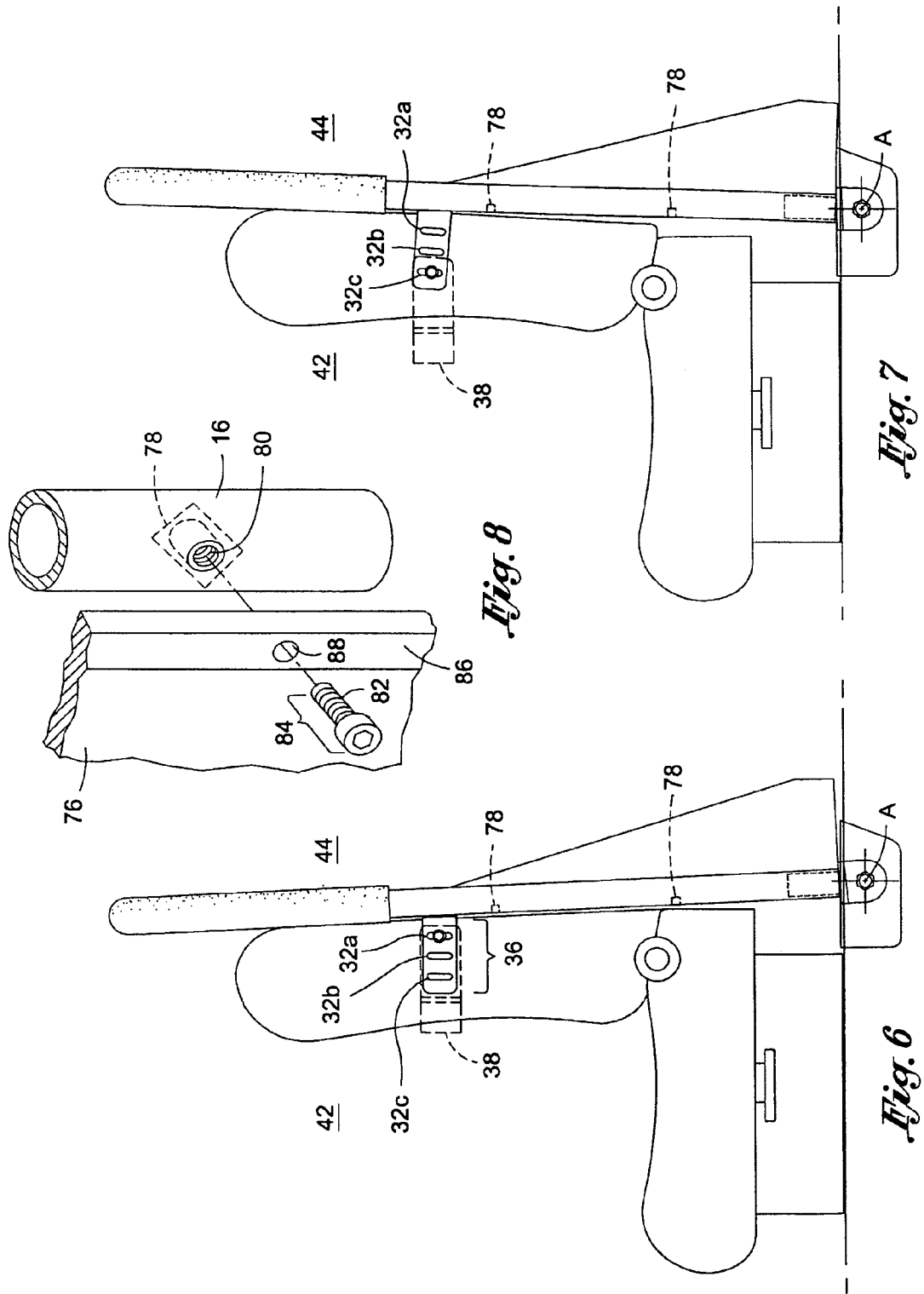

ADJUSTABLE SECURITY PARTITION FOR A VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field of the Invention

The present invention relates to an adjustable vehicle security partition which forms a barrier between front and rear occupant areas of a vehicle. More particularly, the present invention relates to a vehicle partition that is pivotably attachable to a floor mount bracket and angularly adjustable for easy installation of the partition in the vehicle.

2. Description of the Related Art

A vehicle partition may be used as a barrier to separate front and rear occupant areas of a vehicle to protect the driver or a passenger in the front occupant area. By way of example and not limitation, the vehicle partition may be installed within a law enforcement vehicle or taxi cab to prevent a passenger in the rear occupant area of the vehicle from harming the driver or the passenger in the front occupant area of the vehicle.

The vehicle partition may be attached via a mounting bracket to the strongest points of the interior of the vehicle which may include a driver side pillar, a passenger side pillar, the floor on the driver side and the floor on the passenger side. To this end, the vehicle partition may have four flanges which are each bolted to the mounting bracket on the driver side pillar, the passenger side pillar, the floor on the driver side and the floor on the passenger side. Unfortunately, it may be difficult to install the partition in the vehicle because the installer must simultaneously align the two or more flanges to the two or more mounting brackets while attempting to bolt the flanges and mounting brackets together. As such, installation may require two or more people.

Accordingly, there exists a need in the art for an improved vehicle security partition.

BRIEF SUMMARY

The partition discussed herein addresses the deficiencies in the prior art discussed above, discussed below and those that are known in the art. More particularly, the partition may be pivotably mounted to a floor of a vehicle. The partition may then be angularly adjusted to optimally fit behind front seats of the vehicle. This structure reduces the labor requirements necessary to install the partition in the vehicle such that it is contemplated that only one installer may install the partition in the vehicle.

More particularly, to pivotably mount the partition to the floor of the vehicle, a driver side floor mount bracket may be attached to a lower driver side seatbelt mount. Likewise, on the passenger side, a passenger side floor mount bracket may be attached to a lower passenger side seatbelt mount. Both the driver side floor mount bracket and the passenger side floor mount bracket may be equipped with an articulating joint. It is contemplated that the articulating joint may pivot about a common axis. Furthermore, mounts may be attached to each of the articulating joints wherein a frame of the partition is attachable to the mounts. By way of example and not limitation, lower distal end portions of a driver side member and a passenger side member of the frame of the partition may be slid over the mounts such that the installer may lift and push the distal end portions of the driver side member and the passenger side member over the mounts. At this point, the partition is capable of pivoting toward a front occupant area or pivoting backward toward a rear occupant area.

To secure the frame of the partition, a driver side flange may be attached to the driver side member and a passenger side flange may be attached to the passenger side member. The driver side and passenger side flanges may extend forward and have a plurality of slotted holes. Corresponding driver and passenger side upper support brackets may be attached to upper seatbelt mounts. The driver side upper support bracket and the passenger side upper support bracket may have a plurality of apertures that can be aligned to one or more of the slots in the driver side flange and the passenger side flange. During installation, the installer pivots the partition to an optimal angular orientation such that the partition fits within the vehicle. At such time, the aperture formed in the driver side and passenger side upper support brackets may be aligned to one of the plurality of slots formed in the driver side flange and the passenger side flange. The installer may secure the brackets to the flanges with a nut and bolt connection or other mechanical fastening means. The upper and lower seatbelt mounts provide a sturdy and strong support to secure the partition such that an occupant in the rear occupant area cannot rip the partition loose and harm the occupants in the front occupant area.

Also, it is contemplated that the partition discussed herein may be installed by a single person.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a side view of the partition shown in FIG. 1 wherein the partition is at a first angular position;

FIG. 7 is a side view of the partition shown in FIG. 1 wherein the partition is at a second angular position; and FIG. 8 is a perspective view of a side member of the frame incorporating a nut insert for attaching a filler panel to the side member.

DETAILED DESCRIPTION

Figure 1:
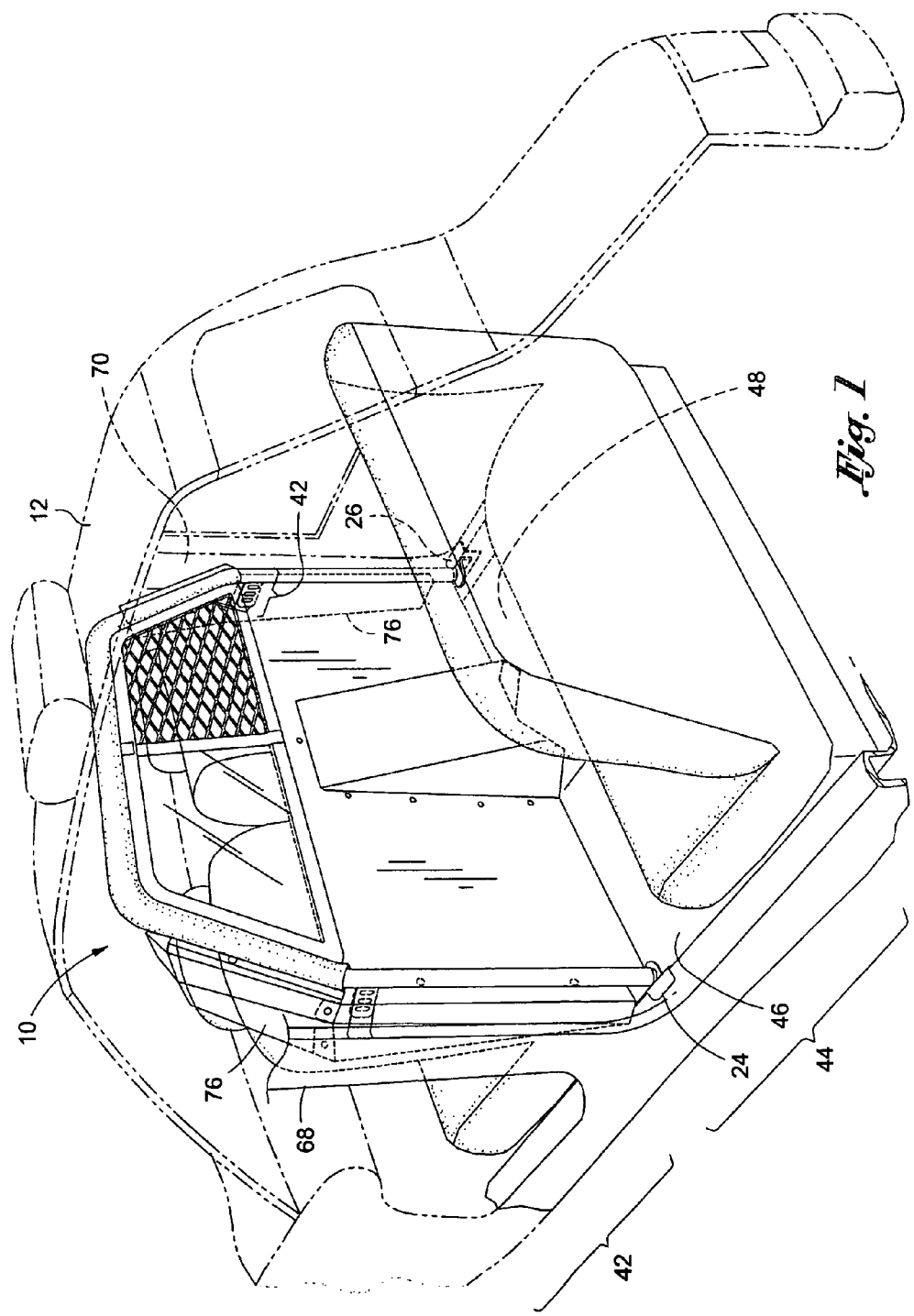
FIG. 1 is an orthographic view of an interior of a vehicle with a security partition installed therein.
Figure 2:
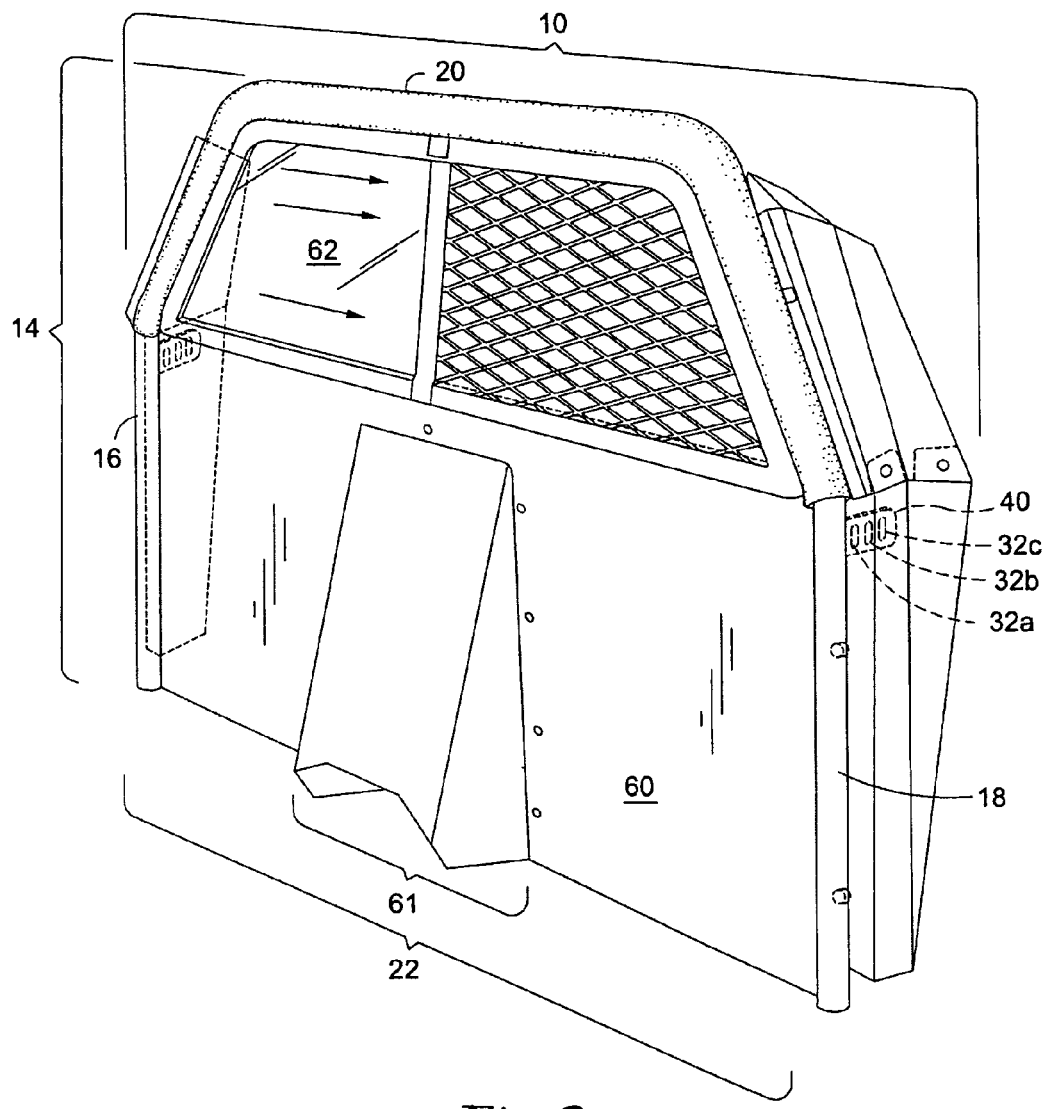
FIG. 2 is an orthographic view of the partition shown in FIG. 1 uninstalled.
Figure 3:
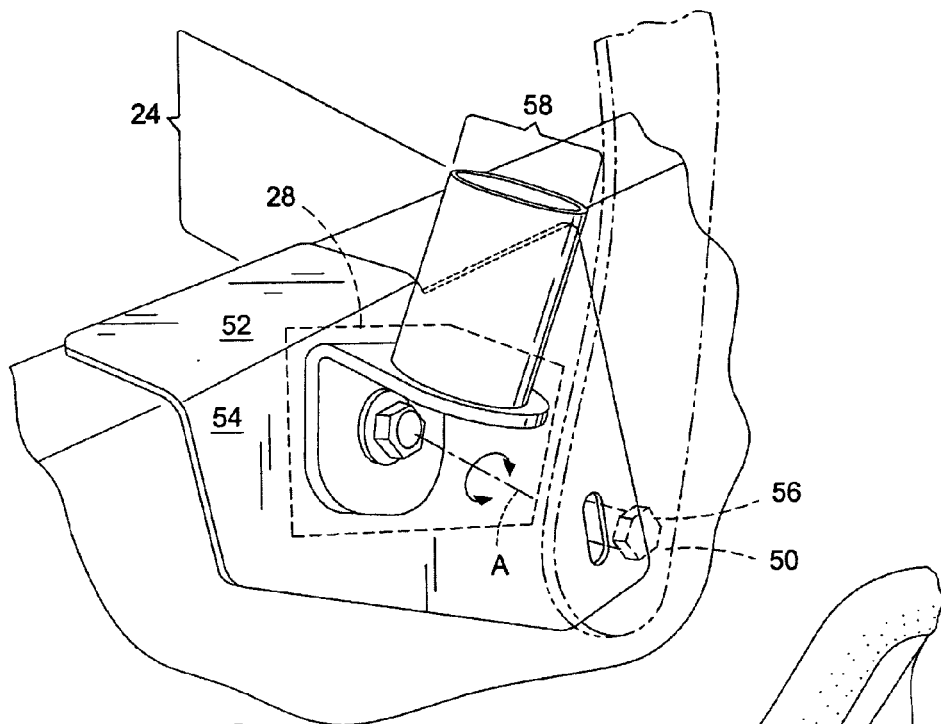
FIG. 3 is an enlarged view of a driver side lower mount bracket with an articulating joint.

Referring now to FIGS. 1 and 2, an adjustable vehicle security partition 10 installed in a vehicle 12 is shown. As shown in FIG. 2, the partition 10 may include a frame 14 having a driver side member 16, a passenger side member 18, a top member 20. A barrier 22 may be secured to the frame 14 (i.e., the driver side member 16, the passenger side member 18, the top member 20). The partition 10 is mounted to a driver side floor mount bracket 24 and a passenger side floor mount bracket 26, as shown in FIG. 1. Referring to FIG. 3, the driver and passenger side floor mount brackets 24, 26 may have articulating joints 28 to permit the partition 10 to pivot about axis A during installation of the partition 10 to make installation of the partition 10 easier. By this construction, the partition 10 may be installed by one person.

Figure 4:
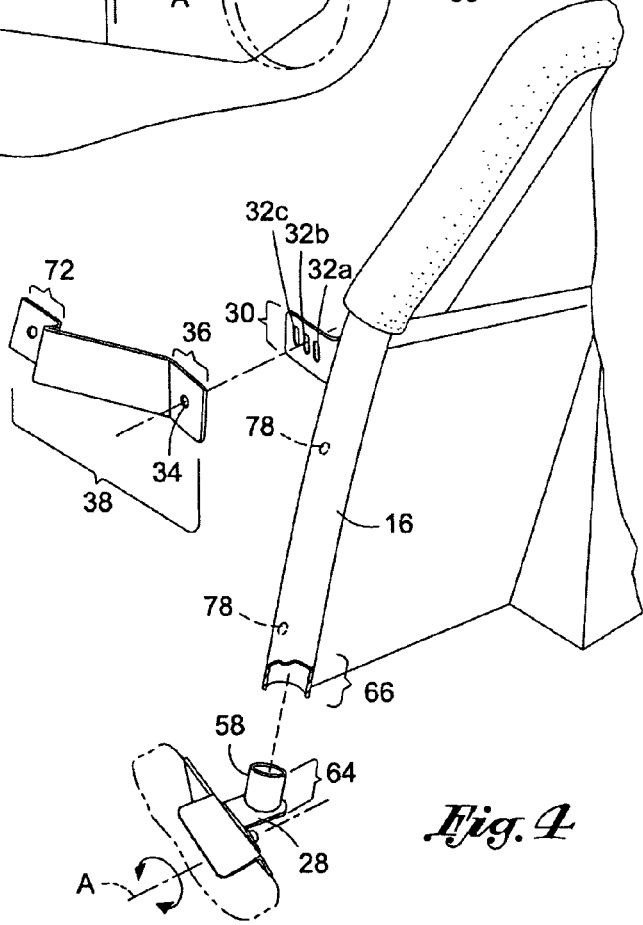
FIG. 4 is an exploded perspective view of the partition.

Referring now to FIG. 4, a driver side flange 30 may be attached to the driver side member 16 wherein the driver side flange 30 may have a plurality of slots 32a, b, c that are alignable to an aperture 34 of a slot engagement portion 36 (see FIG. 3) of a driver side upper support bracket 38 (shown in see FIG. 4). Similarly, a passenger side flange 40 (see FIG. 2) may be attached to the passenger side member 18 (see FIG. 2) wherein the passenger side flange 40 may have a plurality of slots 32a, b, c that are engageable to an aperture formed in the slot engagement portion of a passenger side upper support bracket which is a mirror image of the driver side (briefly shown in FIG. 1 collectively as 42 for purposes of clarity). Throughout the detailed description the installation and description of the partition 10 within the vehicle 12 may be described with respect to the driver side of the vehicle. However, it should be noted that the descriptions provided for the driver side of the partition 10 may be applicable to the passenger side of the partition 10.

As discussed above, the partition 10 is pivotable about axis A (see FIG. 3) during installation. The installer may pivot the partition 10 so that the partition 10 is optimally oriented (i.e., tilted) within the space between the front and rear occupant areas 42, 44 (see FIG. 1) of the vehicle 12. The apertures 34 formed in the slot engagement portions 36 of the driver and passenger side upper support brackets 38 are aligned to one of the plurality of slots 32a, b, c of the driver and passenger side flanges 30, 40. The driver and passenger side upper support brackets 38 and the driver and passenger side flanges 30, 40 may be mechanically fastened to each other with nuts and bolts or other suitable mechanisms.

Prior to attaching the driver and passenger side upper support brackets 38 to the driver and passenger side flanges 30, 40, the driver and passenger side floor mount brackets 24, 26 may be attached to the driver and passenger side floor 46, 48 of the vehicle 12. To this end, the driver side floor mount bracket 24 may be attached to a lower driver side seat belt mount 50, as shown in FIG. 3. Also, the passenger side floor mount bracket 26 may be attached to a lower passenger side seat belt mount, as shown in FIG. 1. More particularly, referring back to FIG. 3, the driver side floor mount bracket 24 may snugly fit against the floor 46 of the foot well on the driver side of the vehicle's occupant area. Likewise, the passenger side floor mount bracket 26 may snugly fit against the floor 48 of the foot well on the passenger side of the vehicle's occupant area. The driver side floor mount bracket 24 may comprise a first portion 52 and a second portion 54. The first and second portions 52, 54 may be laid flush against the floor of the foot well as shown in FIG. 3. The second portion 54 which may have an aperture may be aligned to a mounting hole of the driver side lower seat belt mount 50. To mount the driver side floor mount bracket 24 to the vehicle 12, the bolt 56 (see FIG. 3) holding the lower driver side seat belt mount 50 is removed. The aperture formed in the second portion 54 of the driver side floor mount bracket 24 is aligned to an aperture of the lower driver side seat belt mount 50. These two components 54, 50 may be bolted down to provide a secure attachment of the lower driver side floor mount bracket 50. The passenger side of the partition 10 may have the same structure as the driver side.

The lower driver side and passenger side floor mount brackets 24, 26 may each include a mount 58 (see FIG. 3). The frame 14 of the partition 10 may be secured to the mounts 58 of the lower driver side and passenger side floor mount brackets 24, 26 during installation, as will be discussed further below.

As shown in FIG. 2, the barrier 22 may be attached to the frame 14. By way of example and not limitation, the barrier 22 may be disposed between the driver side member 16, the passenger side member 18, and the top member 20 of the frame 14. The seat back protector plate 60 may be made of steel or any other like material capable of withstanding multiple impacts from a passenger being transported in the rear occupant area 44 of the vehicle 12. The seat back protector plate 60 may have a flat surface. The seat back protector plate 60 may optionally include a recessed portion 61 (see FIG. 2) that may provide additional storage area in the front occupant area 42 of the vehicle 12. Also a window 62 (see FIG. 2) may be disposed between the driver side member 16 and the passenger side member 18. The window 62 should be sufficiently strong to prevent a passenger in the rear occupant area 44 from breaking the window 62 and harming a passenger in the front occupant area 42 while allowing the occupants of the vehicle to see through the window 62. The window 62 may be made of a transparent polycarbonate material or any other like material sufficient to protect the front occupant area 42 from access by a passenger in the rear occupant area 44. In one embodiment, the window 62 may be configured to slide open (see arrows in FIG. 2) to provide access to the rear occupant area 44 from the front occupant area 42 or vice versa. The window 62 may also be made of a metal railing or a portion of the window may include the metal railing.

The mount 58 may be attached to the articulating joint 28, as shown in FIG. 3. The mount 58 may be cylindrical in shape. By way of example and not limitation, the distal end portion 64. (see FIG. 4) of the mount 58 may be coupled to the articulating joint 28 by welding or other methods known in the art. The distal end portion 66 of the driver side member 16 may be hollow and may snugly fit over the mount 58. When the driver side member 16 and the passenger side member 18 are attached to the respective mount 58, the partition 10 is pivotable about the fixed axis A (see FIGS. 3 and 4). The passenger side of the partition 10 may be a mirror image of the driver side. During installation, the distal end portions 64 of the driver and passenger side member 14, 16 of the frame 14 may be attached to the mounts 58 of the driver and passenger side floor mount bracket 24, 26. The partition 10 is now pivotable about axis A within the vehicle 12 prior to attaching the frame 14 to a driver side pillar 68 (see FIG. 1) and a passenger side pillar 70 (see FIG. 1). Although a cylindrical mount 58 is shown, other types of mechanisms may be used to pivotably attach the driver and passenger side member 16, 18 to the floor mount brackets 24, 26. By way of example only and not limitation, the driver and passenger side members 16, 18 may be pivotably attached to the floor mount brackets 24, 26 with a ball and socket joint.

Figure 5:
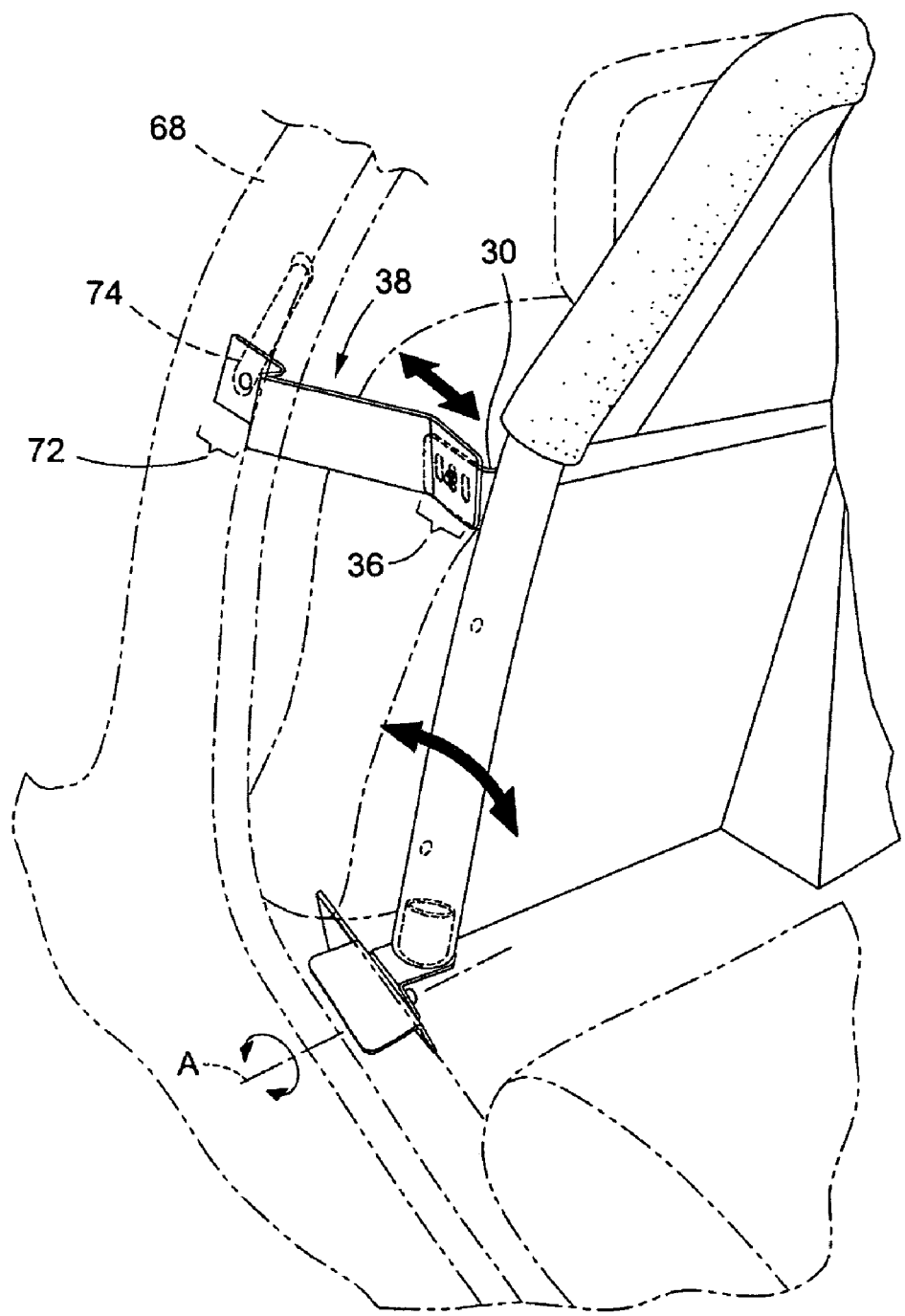
FIG. 5 is an assembled perspective view of the partition shown in FIG. 4.

Referring now to FIGS. 4 and 5, a pillar engagement portion 72 of the upper support bracket 38 may be attached to the driver side pillar 68. The driver side pillar 68 may extend from the roof of the vehicle 12 to the floor. The driver side pillar 68 may also be referred to as a B-pillar. The slot engagement portion 36 of the upper support bracket 38 may be attached to the driver side flange 30. The pillar engagement portion 72 of the upper support bracket 38 may include an aperture to attach the pillar engagement portion 72 to the driver side pillar 68. To this end, an upper seat belt mount 74 (see FIG. 5) may be removed from the driver side pillar 68 by removing a bolt that secures the upper seat belt mount 74 to the driver side pillar 68. After the upper seat belt mount 74 is removed from the driver side pillar 68, the aperture formed in the pillar engagement portion 72 of the upper support bracket 38 is disposed underneath the upper seat belt mount 74. The bolt is reinserted into the driver side pillar 68 and tightened to secure both the upper seat belt mount 74 and the upper support bracket 38 to the driver side pillar 68.

The driver side member 16 of the frame 14 may have an open ended distal end (see FIG. 4) that may be configured to fit over the mount 58 of the floor mount bracket 24. When the installer is installing the partition 10 into the vehicle 12, the installer may slip the driver side member 16 into engagement with the mount 58 of the driver side floor mount bracket 24. Thereafter, the installer may slip the passenger side member 18 into engagement with the mount of the passenger side floor mount bracket 26. Now, the partition 10 is pivotable about axis A via the articulating joints. Pivoting the partition 10 may allow the installer to optimally angle the partition 10 such that the partition 10 may fit within the occupant area 42, 44 of the vehicle. Once the partition 10 is tilted to the optimal angle, the aperture 34 of the slot engagement portion 36 of the driver and passenger side upper support bracket 38 may be aligned to one of the plurality of apertures 32a, b, c formed in the upper driver and passenger side flanges 30, 40. The brackets 38 may be secured to the flanges 30, 40 via nuts and bolts.

Referring now to FIG. 6, the aperture 34 (see FIG. 4) of the slot engagement portion 36 of the upper support bracket 38 may be aligned with one or more of the three slots 32a, b, c and secured using a fastener. By way of example and not limitation, the partition 10 is adjustable by pivoting the partition 10 toward the front occupant area 42 to align the aperture 34 of the slot engagement portion 36 of the upper support bracket 38 to the first slot 32a (see FIG. 4). Conversely, referring to FIG. 7, the partition 10 may be pivoted back toward the rear occupant area 44 and secured with a fastener. The aperture 34 formed in the slot engagement portion 36 may be aligned to the third slot 32c (see FIG. 4). As a result, the partition 10 may be easily adjusted during assembly such that it is contemplated only a single person/installer is capable of installing the partition 10 in the vehicle 12. After the partition 10 is installed in the vehicle 12, the partition 10 may be readjusted to provide more or less room in the front occupant area 42 or the rear occupant area 44, as desired. The installer need only remove the fastener attaching the slot engagement portion 36 of the upper support bracket 38 from the side flanges 30, 40 and reattach the slot engagement portion 36 of the upper support bracket 38 to a different slot 32a, b or c.

With reference to FIGS. 1 and 2, filler panels 76 may be attached to the driver and passenger side members 16, 18 on lateral sides of the partition 10 to prevent a passenger in the rear occupant area 44 from reaching around the barrier 22 and harming the occupants in the front occupant area 42. To aid in the installation or attachment of the filler panels 76 to the driver and passenger side members 16, 18, the use of nut inserts 78 may be incorporated into the partition 10. By way of example and not limitation, nut inserts 78 may be embedded or incorporated into the driver and passenger side members 16, 18. These nut inserts 78 may have an exterior surface generally flush with the exterior surface of the driver and passenger side members 16, 18, as shown in FIG. 8. The nut inserts 78 may be seated within the driver and passenger side members 16, 18. The nut inserts 78 may have a threaded hole 80 sized and configured to receive threads 82 of a bolt 84. The filler panels 76 may have lips 86 having one or more apertures 88 that are alignable to the nut insert 78 formed in the driver and passenger side members 16, 18. To assemble the filler panels 76 onto the frame 14, the apertures 88 formed in the lips 86 of the filler panels 76 are aligned to the nut inserts 78 formed in the driver and passenger side members 16, 18. Once these apertures 88 of the filler panels 76 are aligned to the nut inserts 78, bolts 84 are inserted through the apertures 88 and threadingly engaged to the nut inserts 78. The bolts 84 are tightened down to secure the filler panels 76 to the frame 14 or the driver and passenger side members 16, 18. Conversely, it is contemplated that the nut inserts 78 may be incorporated into the filler panels 76 and the bolts 84 may proceed through an aperture formed in the driver and passenger side members 16, 18.

The nut and bolt connection between the driver side and passenger side upper support brackets 38 bracket with the driver and passenger side flanges 30, 40 may be attached to each other with a nut insert system. The nut insert may be incorporated into the upper support bracket 38, or alternatively, in the side flanges 30, 40.

The above description is given by way of example, and not limitation. Given the above disclosure, one skilled in the art could devise variations that are within the scope and spirit of the invention disclosed herein, including various ways of installing an adjustable vehicle security partition. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An adjustable security partition for providing a barrier between a front occupant area and a rear occupant area of a vehicle to prevent a first occupant sitting in the rear occupant area from harming a second occupant sitting in the front occupant area, the vehicle including driver and passenger seat belts, each seat belt having upper and lower seat belt mounts, the partition comprising:
   driver side and passenger side floor brackets, each bracket including a base attachable to the lower seat belt mounts of the driver and passenger seat belts, each bracket including an articulating joint attached to the base and a barrier mount attached to the articulating joint;
   a barrier defining a lower portion attachable to the barrier mount so the barrier may pivot about the articulating joint; and
   driver side and passenger side upper support brackets attachable to upper seat belt mounts of the driver and passenger seat belts, the barrier attachable to the upper support brackets.

2. The partition of claim 1 further comprising flanges attached to the barrier, the each of the flanges having a plurality of first apertures alignable to second apertures formed in the driver side and passenger side upper support brackets for securing the barrier.

3. The partition of claim 2 wherein the plurality of first apertures are a plurality of slots.

4. The partition of claim 1 wherein the mounts are cylindrical and the barrier has mating tubes sized to snugly fit over the mounts.

5. The partition of claim 2 wherein pivoting the barrier forward or rearward aligns a different one of the plurality of first apertures to the second apertures.

6. The partition of claim 1 further comprising side filler panels attached to sides of the barrier, the side filler panels extending outward from lateral sides of the barrier to prevent the occupant in the rear occupant area from reaching around the barrier and harming the occupant in the front occupant area.

7. The partition of claim 6 wherein the side filler panels are attached to the sides of the barrier with a nut insert.

8. The partition of claim 7 wherein the nut insert is embedded into the barrier.

9. The partition of claim 1 wherein the barrier includes a frame, a window and a seat back protector plate, the window and the seat back protector plate secured to the frame, the window disposed above the seat back protector.

10. An adjustable security partition for providing a barrier between a front occupant area and a rear occupant area of a vehicle to prevent a first occupant sitting in the rear occupant area from harming a second occupant sitting in the front occupant area, the vehicle defining a lower portion, an upper portion, a driver side and a passenger side, the partition comprising:

driver side and passenger side floor brackets, each bracket including a base attachable to the lower portion of the vehicle, each bracket including an articulating joint attached to the base and a barrier mount attached to the articulating joint;

a barrier defining a lower portion attachable to the barrier mount so the barrier may pivot about the articulating joint; and driver side and passenger side upper support brackets attachable to upper portion of the vehicle, the barrier attachable to the upper support brackets.

11. The partition of claim 10 wherein the driver side and passenger side floor brackets are attachable to driver side and passenger side pillars or driver side and passenger side floors, and the driver side and passenger side upper support bracket are attachable to the driver side and passenger side pillars or a roof of the vehicle.

12. A method of installing an adjustable security partition within a vehicle defining a lower portion and an upper portion, the method comprising the steps of:

affixing driver side and passenger side articulating joints to the lower portion of the vehicle;

mounting a barrier to the driver side and passenger side articulating joints so the barrier is capable of pivoting toward a front occupant area or rearward toward a rear occupant area;

pivoting the barrier to an optimal angular orientation; and affixing the barrier to the upper portion of the vehicle.

13. The method of claim 12 wherein the affixing the driver side and passenger side articulating joints includes the step of affixing the driver side and passenger side articulating joints to lower seat belt mounts of the vehicle.

14. The method of claim 12 wherein the affixing the driver side and passenger side articulating joints includes the step of affixing the driver side and passenger side articulating joints to driver and passenger side pillars.

15. The method of claim 12 wherein the affixing the barrier to the upper portion of the vehicle includes affixing the barrier to the upper seat belt mounts of the vehicle.

* * * * *